United States Patent [19]

Wickenberg

[11] 4,191,109
[45] Mar. 4, 1980

[54] END FITTING FOR CARGO CONTAINERS

[75] Inventor: Chester H. Wickenberg, Elgin, Ill.

[73] Assignee: Transco Inc., Chicago, Ill.

[21] Appl. No.: 878,326

[22] Filed: Feb. 16, 1978

[51] Int. Cl.² .................... B61D 17/08; B60P 7/14
[52] U.S. Cl. ................................. 410/149; 410/135
[58] Field of Search ........................... 105/489–493,
105/494–499, 500–503, 376; 248/357;
211/105.3, 105.4, 105.6, 123

[56]  References Cited

U.S. PATENT DOCUMENTS

| | | | |
|---|---|---|---|
| 2,983,232 | 5/1961 | Henrikson | 105/499 |
| 3,151,571 | 10/1964 | Heard | 105/499 |
| 3,402,680 | 9/1968 | Hyatt | 105/499 |
| 3,411,459 | 11/1968 | Hyatt | 105/499 |
| 3,554,136 | 1/1971 | Falk | 105/493 |

Primary Examiner—Stephen G. Kunin
Assistant Examiner—Lawrence E. Williams

[57] ABSTRACT

An end fitting in the form of a head for a cargo-retaining bar of the type used with a belt rail to restrain or support cargo against shifting or movement in a truck, railroad car or the like. The end fitting includes a coupling apparatus adapted to be received in a retaining slot formed in a belt rail attached to the inner walls of the cargo vehicle.

3 Claims, 6 Drawing Figures

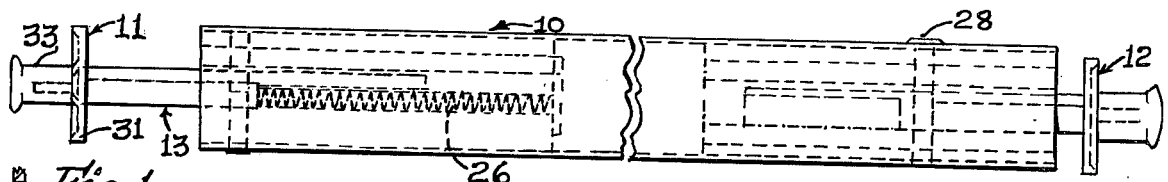
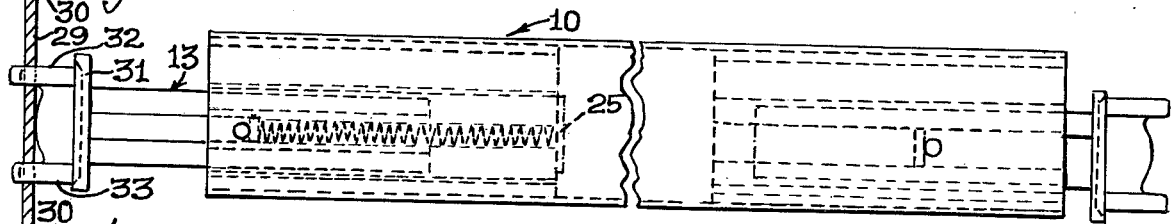
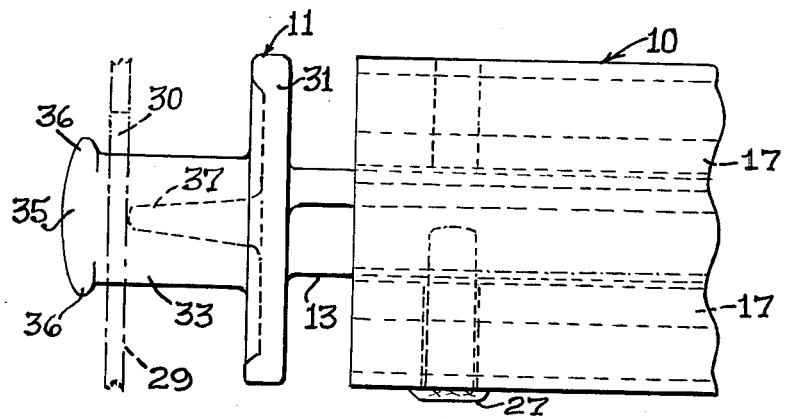
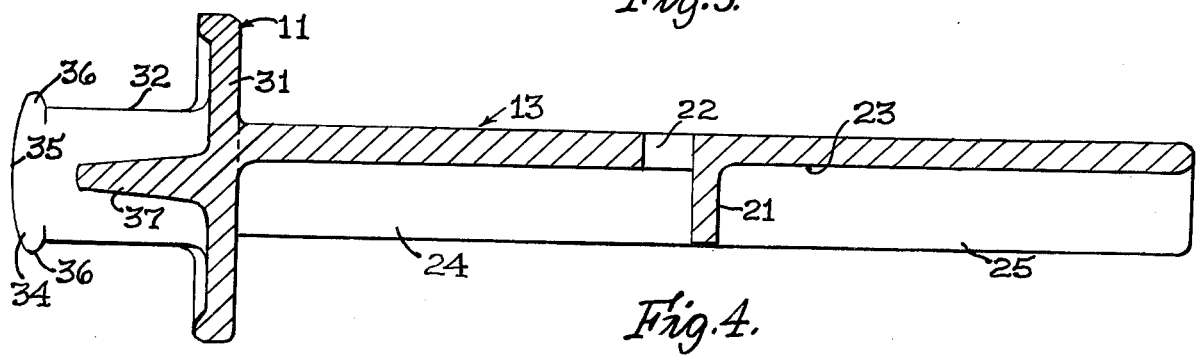
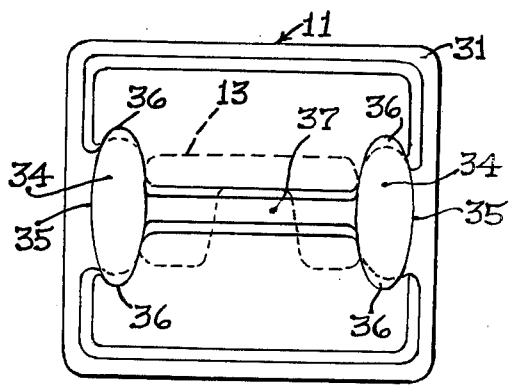
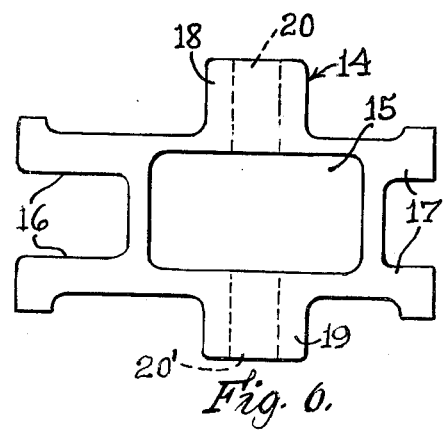

END FITTING FOR CARGO CONTAINERS

SUMMARY OF THE INVENTION

Prior end fittings required a hooktype latch element contacting a wall member for preventing longitudinal displacement of the crossbar from the cooperating belt rail. This type of combination and arrangement of parts is shown and described in the Assignee's U.S. Pat. No. 2,976,824.

It has now been determined that spring-biasing in a direction through the longitudinal axis of a cargo bar of the end fitting or locking head against the belt rail, is sufficient to maintain the crossbar connected to the belt rail.

Cargo bars or crossbars are formed as round, square or rectangular, high-strength, tubular steel or aluminum beams having end fittings which can be selectively coupled or locked in interfitting relation with belt rails mounted on the inside walls of cargo vehicles.

The present invention is adapted to be associated with a belt rail which provides throughout its longitudinal length a plurality of vertically extending slots adapted to receive cooperating elements provided by the end fitting or head of the cargo bar for interconnection therebetween.

The object of the present invention is to provide an end fitting for a cargo bar or crossbar which may be easily coupled to the belt rail and one which is economical to manufacture and has high strength and durability and a minimum number of moving parts.

GENERAL DESCRIPTION

The invention will be best understood by reference to the accompanying drawings which shows the preferred form of the invention by which the stated objects are achieved, and in which:

FIG. 1 is a side elevational view of the crossbar showing certain internal parts in dotted lines;

FIG. 2 is a plan view of the crossbar similar to that shown in FIG. 1, and showing in fragmentary detailed section the belt rail with which the crossbar is associated;

FIG. 3 is a fragmentary enlarged view of the end fitting in a retracted position; and FIG. 4 is a side elevational detailed sectional view of the end fitting;

FIG. 5 is a frontal view of the end fitting and crossbar; and

FIG. 6 is an end view of the crossbar-receiving sleeve as employed in this invention.

As shown in FIGS. 1 and 2, there is an elongated cargo bar or crossbar 10, which is preferably formed from a rectangular aluminum casing. Carried at either end of the crossbar 10 are a pair of end fittings 11 and 12, which are contained at the free exposed end of a U-shaped shank 13.

Projected into either end of the crossbar 10 is an end fitting retaining sleeve 14, as shown in FIG. 6. This sleeve 14 provides an internal rectangularly shaped channel 15 corresponding in size to the U-shaped shank 13 of the end fittings 11 and 12. The sleeve 14 provides a set of spider legs 16 and 17 projecting outwardly from either side of the channel 15. It should be noted that the legs 16 are of a longer length than the legs 17 so as to dispose the channel 16 off-center with respect to the center line of the crossbar 10, this for a purpose hereinafter made apparent. Extending from the top and bottom of the sleeve 14 are a pair of bushings 18 and 19 each providing passages 20 and 20' therethrough having open communication with the channel 15.

Referring to FIG. 4, it is shown that the U-shaped shank 13 is provided midway throughout its longitudinal length with a restraining wall 21 which is positioned immediately adjacent to an opening 22 formed through the bight portion 23 of the U-shaped shank 13. Between the legs of the U-shaped shank 13 there is provided a forward channel 24 disposed between the restraining wall 21 and the end fitting 11, and a rear channel 25 which extends to the opposite side of the restraining wall 21 throughout the remaining length of the U-shaped shank 13. Adapted to be connected upon the rear end of the sleeve 14 so as to close the channel 15 formed therein is an end plate 25' (see FIG. 2). Disposed within the channel 15 and within the rear channel 25 provided by the U-shaped shank 13, is a coil spring 26. By this arrangement the end fitting 11, as shown in FIGS. 1 and 2, is telescopically contained within that end of the crossbar 10. To prevent the complete withdrawal of the end fitting 11 from the crossbar 10, a stop pin 27 is projected through the wall of the crossbar 10 and the opening 20' formed in the bushing 19 of the sleeve 14 and into the forward channel 24 provided by the U-shaped shank 13 of the end fitting 11. Thus, as shown in FIGS. 1 and 2, the coil spring 26 may project the end fitting 11 outwardly of the end of the crossbar 10 until the restraining wall 21 engages the inner end of the pin 27.

The opposite end of the crossbar 10, as shown in FIGS. 1 and 2, may be constructed so as not to be telescopically connected. To accomplish this, a pin 28 is projected through the wall of the crossbar 10 and is of such a length that it will project through the bushings 20 and 20' formed in the sleeve 14 and through the opening 22 formed in the bight portion 23 of the shank 13 forwardly of the restraining wall 21.

As previously stated, the cargo retaining bar or crossbar 10 of this invention is adapted to be used in conjunction with a belt rail 29 (see FIGS. 2 and 3), which provides throughout the longitudinal length a plurality of vertically disposed elongated slots 30.

To connect the crossbar 10 to the belt rails, the end fittings 11 and 12 provide connecting means which are identical in configuration and construction, and therefore only the end fitting 11 will be hereinafter described, with the understanding that the same description applied to the end fitting 12, as shown.

The end fitting 11, as shown in FIG. 4, provides a vertical hand-gripping plate 31 from which the U-shaped shank 13 projects. The hand gripping-plate 31 provides a base for a pair of spaced apart flanges 32 and 33, which extend in the direction of the longitudinal length of the end fitting, as shown. Each of the flanges 32 and 33 terminates into an enlarged oblate ellipsoid insert member 34, the edges of which provide camming surfaces 35 and 36 beyond the corresponding longitudinal edges of the flanges 32 and 33, yet equal in size to the width of the slots 30. Extending between the flanges 32 and 33 is a retaining tongue 37 of a length less than the flanges 32 and 33, and it, too, has its exposed edge rounded transversely with respect to its longitudinal length.

In use, the cargo-retaining bar 10 has its end fitting 12 attached to one belt rail, and the end fitting 11 is telescopically moved in the direction of the body of the crossbar 10 by gripping the hand plate 31 thereof and pulling the same against the spring 26. When the flanges 32 and 33 are in alignment with the slots 30 in the belt rail, the end fitting 11 is released, and the flanges 32 and 33 will be forcibly projected into the slots 30, with the camming surfaces 35 and 36 of the insert member 34 moving behind a portion of the wall of the belt rail 29 defining the slot 30, as seen in FIG. 3. It should also be noted that the configuration of the camming surfaces 35 and 36 provides for engagement with the wall portion defining the slots 30 in the event that the crossbar 10 is not in horizontal alignment therewith, so that when the end fitting 11 is released under such condition, the camming surfaces 35 and 36 would cause the flanges 32 and 33 to be forced into the slots 30 and retained therein as hereinbefore stated. The retaining tongue 37 will bear against the full wall section between the slots 30 of the belt rail 29 under the expansion of the coil spring 26 and will be forcibly retained in contact with the belt rail. The full engagement of the retaining tongue 37 with all of the wall section between the slots 30 provides a solid engagement, which results in a more positive contact between the end fitting 11 and the supporting belt rail 29.

As previously noted, the end fittings 11 and 12 as contained in the channel 15 of the sleeve 14 are offset with respect to the center line of the crossbar 10. By this arrangement, horizontal adjustment of the crossbar against the freight to be retained thereby may be achieved by rotating the crossbar 10 through 180°. This rotation coupled with the offset, permits a horizontal adjustment of the crossbar 10 relative to the belt rail 29 for closer contact and retention of cargo within the vehicle.

It should be noted that from the foregoing construction the retaining tongue 37 as it extends between the flanges 32 and 33, adds rigidity to such flanges and strengthens the entire end fitting against stresses placed thereon when the end fitting is connected to the belt rail 29. The retaining tongue 37 also functions to space the hand-gripping plate 31 from the belt rail 29 so as to provide easy access for the hand or tool, if necessary, when displacing the end fitting 11 from engagement with the belt rail 29.

From the foregoing, it is apparent that I have provided a crossbar which is easily coupled to the belt rail and one which possesses a minimum number of moving parts and has a high degree of strength and durability.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. An end fitting for a cargo retainer such as a crossbar cooperating with parallel belt rails mounted on opposite walls of a freight vehicle providing side-by-side vertically extending slots formed throughout their longitudinal length comprising
    (a) a crossbar in the form of a tubular member extending across the vehicle between the belt rails with said crossbar reversible through 180° about its longitudinal axis,
    (b) a coupling means on each end of said crossbar with one of said coupling means yieldably biased endwise of the bar,
    (c) said coupling means providing a hand gripping plate extending transversely of the longitudinal axis and to either side of the horizontal axis of the crossbar,
    (d) a pair of spaced flanges extending outwardly of said hand gripping plate parallel to the longitudinal axis of said bar and adapted to be inserted into the vertical slots formed in the belt rails for connecting said crossbar thereto,
    (e) oblate ellipsoid shaped means on the outermost ends of said flanges for aiding in camming said ends into the slots provided by the belt rails, and
    (f) a retaining tongue extending between said flanges and of a length less than said flanges and disposed along a transverse center line extending therebetween and in the mid plane of the crossbar and adapted to be yieldably biased into full facial contact with one wall of the belt rail which faces the crossbar between the slots provided therein while spacing said hand gripping plate therefrom.

2. An end fitting for a cargo retainer as defined in claim 1, wherein said oblate ellipsoid shaped means is of a size slightly less than the width of the slots so as to be insertable therein and providing enlarged camming surfaces extending above and below corresponding longitudinal edges of said flanges so as to lie beyond the wall of the belt rail defining the slots therein when said coupling means is connected thereto.

3. An end fitting for a cargo retainer as defined in claim 1, wherein said spaced flanges are of a height less than said hand-gripping plate so as to provide an access area therebetween and above and below said means extending between said flanges that has facial contact with the wall of the belt rail between the slots when the coupling means is connected to said belt rail.

* * * * *